US008402059B2

(12) United States Patent
Sanders et al.

(10) Patent No.: US 8,402,059 B2
(45) Date of Patent: Mar. 19, 2013

(54) INTERNET DIRECTORY SYSTEM

(76) Inventors: Susan Q. Sanders, Austin, TX (US);
Glen N. Sanders, Jr., Austin, TX (US)

( * ) Notice: Subject to any disclaimer, the term of this patent is extended or adjusted under 35 U.S.C. 154(b) by 0 days.

(21) Appl. No.: 13/573,043

(22) Filed: Aug. 16, 2012

(65) Prior Publication Data

US 2012/0316974 A1  Dec. 13, 2012

Related U.S. Application Data

(63) Continuation of application No. 10/776,069, filed on Feb. 11, 2004.

(60) Provisional application No. 60/448,353, filed on Feb. 19, 2003.

(51) Int. Cl.
*G06F 7/00* (2006.01)
*G06F 17/30* (2006.01)
(52) U.S. Cl. .................................. 707/790; 707/802
(58) Field of Classification Search .................. None
See application file for complete search history.

(56) References Cited

U.S. PATENT DOCUMENTS

| 2002/0013774 A1* | 1/2002 | Morimoto ................. 705/80 |
| 2003/0014399 A1* | 1/2003 | Hansen et al. ................ 707/3 |
| 2004/0111438 A1* | 6/2004 | Chitrapura et al. ........ 707/200 |

OTHER PUBLICATIONS

"From Design Features to Financial Performance: A Comprehensive Model of Design Principles for Online Stock Trading Sites", by Lee et al., Journal of Electronic Commerce Research, vol. 3, No. 3, 2002.*
www.google.com—archived webpages from Feb. 22, 2002.*
www.ebay.com—archived webpages from Nov. 15, 2002.*
www.pricewatch.com—archived webpages from Jan. 28, 2003.*
www.yahoo.com—archived webpages from Dec. 9, 2002.*

* cited by examiner

*Primary Examiner* — Jay Morrison
(74) *Attorney, Agent, or Firm* — Sue Z. Shaper

(57) ABSTRACT

Improved Internet Directory System including an upper-level Directory Provider referencing a plurality of independently owned for-profit Category Directory Websites, the Category Directory Websites referencing websites relating to a category and being identified as participating in the System by at least a mark or URL, and including a business model imposed on the Category Directory Websites.

20 Claims, 4 Drawing Sheets

INTERNET DIRECTORY SYSTEM

CROSS REFERENCE TO RELATED APPLICATIONS

This application claims priority to and is a continuation of co-pending application Ser. No. 10/776,069, filed Feb. 11, 2004, entitled An Improved Internet Directory System, inventors Susan Q. Sanders and Glen N. Sanders, Jr., which claims priority to provisional Application Ser. No. 60/448,353 filed Feb. 19, 2003 entitled "Improved Internet Directory to Increase Website Visibility and Generate Revenue".

FIELD OF THE INVENTION

This invention relates to an Internet Directory System that increases website visibility, creates profitable Internet related businesses and generates a stable revenue stream for website directories and Internet Service Providers, or the like. More particularly, this invention proposes a system that generates stable revenue streams by creating profitable independent businesses that manage and promote categories of Internet information. Collectively, these businesses form an improved Internet Directory, hosted by an Internet Service Provider/Search Engine or the like and charging relevant referenced websites.

BACKGROUND OF THE INVENTION

Discussion of Prior Art

Due to the enormous volume of content associated with the Internet, it is not unusual for search engines to identify thousands, if not millions of web sites as the outcome of a single search query. These results are bundled and presented to the User in groups of 10 to 25. The viewer is automatically presented the first group/page of sites, then must request any additional listings. As a result, the competition is stiff to be included in the top/first group of websites. Some websites pay fees to boost their rankings, while others might enter into strategic partnerships or reciprocal agreements to improve their position. As a result the top listings may not be the best websites, or most the popular in that category.

By contrast, Internet Directories organize the web by super categories, then by categories and subcategories. This allows users to further define their search at each new level, reducing the number of potential "hits," and increasing the quality of the response. FIG. 1 provides a flow chart of Internet Directories' prior art. A user first chooses an Internet Service Provider (ISP) or Search Engine 10, electing to use its Internet Directory for the search, reviews a predefined list, and with the click of a mouse selects a specific field or super category 12. With each click, the universe of the search is narrowed and the User is moved to the lower level of categories 13. The process continues to subcategories 18 until the options are reduced to a manageable size and the targeted URL is located. A hypertext link then transports the user to the desired site.

A drawback to this approach is each category/subcategory needs to be monitored, managed and updated to ensure the quality of the directory and the success of a search. With a potential of thousands or even millions of categories and subcategories this can be a costly proposition. To manage this problem, "Open Directory Project" (copyright 1998-2003 Netscape) enlists the services of almost 55,000 volunteer editors. These editors cannot begin to cover the over 460,000 categories or the 3.8 million websites (only about 10% of Google's websites) in the Open Directory database. These volunteers get paid nothing, and as is best understood have little or no training and do not have a vested interest in the success of the site. In addition, volunteer editors are not positioned to design, host and manage individual webpages. There is no financial incentive for the volunteers to attract new webpages by providing value added services or cutting edge technology to enhance the webpages within the domain. The volunteers do not advertise or promote their category to attract new viewers. The "Open Directory" does not charge to list a URL or to use the Directory. As best understood, revenue is generated by advertising clicks and through business relationships with Internet search engines utilizing the Open Directory Project. There is no new or innovative Internet business model to support the Directory. In fact, the "Open Directory" model is not unlike the one faulted for fueling the demise of the dot.com era.

A subset of Internet Directory is the Electronic Yellow Pages (EYP). The EYP is an electronic version of the Yellow Pages Telephone Books. There are currently about 3.3 million EYP websites in multiple categories (local, regional, national, international, language, business sector, etc), In addition to providing business listings by category and sub-category, and by city state, region, or nation, the EYPs usually provide some level of value added services such as reverse searches, coupons, maps, directions, information on what is nearby, links to city guides, links to the listed business' websites, website development, and website hosting. As best understood, webpages are charged for one or more of the services provided, and for the number of times viewers are drawn to and "click" on associated advertisements.

Like the Internet Directories, each EYP operates as a individual business. There are several drawbacks to this monolithic business model. First to compete, each competitor replicates this enormous structure. This means the same basic service is being offered to the same universe of businesses. With over 3 million EYPs, the dollars from listed businesses and from advertising is thinly spread across the EYP industry. Second, EYPs that charge to list a business will have incomplete databases that can limit EYP effectiveness and value to users. Lastly, with each EYP supporting thousands of categories/subcategories it cannot afford to manage and promote each category.

To provide category management and specialized support, there are a growing number of independent Directory Websites. These websites provide a list of businesses in their category with hypertext links to related webpages. As independent businesses dedicating to providing a Directory Website (also known as a portal) for a specific category, they can tailor their website and the services it provides to best support that category.

Unfortunately, all these sites are not listed in an Internet Directory Service, and the URLs do not identify them as directory sites, making them difficult to locate. When one is located, it may or may not contain the comprehensive listings expected. For example, "doctors.com" does not provide a roster of all medical doctors by location and specialty, but does list 10 health associations with links to their sites. On the other hand, "physicians.com" does list medical doctors, but only plastic surgeons. "Lawyers.com" provides a comprehensive list of all the attorneys and law firms in the United States, but "attorneys.com" does not. It is hit or miss to both find these sites and to find sites with comprehensive listings.

Summary of Prior Art—Pros and Cons

Currently there are three primary methods to locate websites on the Internet: Search engines, Internet directories (including Electronic Yellow Pages) and independent directory websites. Each of these has pros and cons, discussed above.

The primary method is the search engine. As discussed above, due to the tremendous volume of content on the Internet, it is not unusual for a search engine to identify thousands, if not millions of web sites as the outcome of a single search query. The results are bundled into groups of 10 to 40 listings per page. The user is immediately presented with the first group/page. Additional pages must be requested, so it is highly advantageous for websites to be included on the first page. Depending on the search engine, top websites are chosen by their popularity (number of hits), how much a website is willing to pay for a priority listing or on strategic alliances with the search engine/search engine host. As a result, using a search engine to find specific information can be cumbersome and slow.

By contrast, Internet Directories organize the web by super categories or "fields", then by categories and subcategories, as discussed above. Drawbacks to this approach are that each category/subcategory needs to be monitored, managed and updated to ensure the quality of the directory and the success of a search. With a potential of thousands or even millions of categories and subcategories, this represents a huge undertaking. E.g. to attempt to manage this problem, the "Open Directory Project" (copyright 1998-2003 Netscape) enlisted the services of almost 55,000 volunteer editors. These editors, however, could not begin to cover the over 460,000 categories or the 3.8 million websites in the "Open Directory" database (only about 10% of Google's websites). The volunteers were paid nothing, and were not in a position to advertise and promote the category, design and host websites using cutting edge technology or provide other value added services. In short, there are many shortcomings associated with the Internet business model in the "Open Directory."

A subset of the Internet Directory is the Electronic Yellow Pages (EYP). The EYP is an advertisements. In addition to providing traditional business listings, most EYP search engines are able to sort the directory listings by category, subcategory, city, state, region or nation. Many EYPs also provide some level of value added service such as reverse searches, coupons, maps, directions, information on what is nearby, links to city guides, links to the listed business' websites, website development and website hosting. However, since EYPs list all categories of business, again they cannot afford to manage or promote each individual category and subcategory. As a result, the information in the directory may or may not be current or complete. There are currently about 3.3 million EYP websites, each replicating the same enormous structure and providing similar services to the same universe of users. Businesses can't pay to advertise or post their websites on all 3 million sites. As a result, the robust revenue stream generated by the Yellow Pages Telephone books is not there for the EYPs.

The third method is directory websites. These websites provide listings of businesses within a category with links to the business websites. Because they represent specific categories of information, these websites can be tailored to support their individual domains. Unfortunately, these sites are not consolidated under an Internet Directory Service so they are difficult to find. And when a directory website is located, there is no guarantee it will be complete. For example, "doctors.com" lists 10 health associations, while "physicians.com" lists only plastic surgeons. "Lawyers.com" appears to provide a fairly comprehensive list, but "attorneys.com" does not. It is hit or miss to find good directory websites with comprehensive listings. The user cannot, by reference to an identifying mark or URL, have any reasonable expectation of uniformity of content, organization, comprehensiveness and/or up-to-dateness.

SUMMARY OF THE INVENTION

The basic system of the instant improved Internet Directory includes at least one upper-level Directory Provider (DP). The upper-level Directory Provider is envisioned to be one (or more) ISPs or Search Engines, but could be a different entity with suitable capabilities. The DP (which may be frequently referred to as if it were an ISP) maintains a directory referencing all participating independent directory websites, referred to as Category Directory Websites (CDWs). The System includes identification of the CDWs by some mark, preferably a portion of a URL, and the imposition of a business plan or business model, primarily on the CDWs. At least one aspect of a business plan or model may be imposed at the DP level. At least one DP may have imposed on it a standard of comprehensiveness in covering all relevant categories with a CDW. The business plan or model may have portions focused toward the economics of the System and portions focused toward user standards, including user attraction/retention/affinity issues. For instance, user standards could provide a standard for design, technology and content of a CDW site.

The System includes a plurality of participating CDWs, independently owned, at least with respect to each other and the at least one DP. (Of course, some CDWs could end up commonly owned or controlled.) The CDWs are for-profit and provide a directory with respect to a category, referencing therein all participating and/or relevant websites (WSs). At least some of the WSs should be charged for at least one service. One service could be simply the listing. The WSs might be charged only for enhancements of their listings. The business model or plan preferably provides for a CDW to be substantially funded by payments from WSs, and for expenses for advertisement by the CDWs in order to promote the category and/or the site, being substantially offset by income from offering advertising space on the site. Alternately, an advertising firm could trade one for the other.

The business plan or model might include elements intended to attract and retain user affinity, such as relevant category definitions; common, uniform and user friendly organizational structure for the directories; requirements of comprehensiveness for securing a sufficient number of and percent of participating websites taking into consideration the nature of the category; minimum standards for updating website references, including adding new websites and deleting no longer viable websites; and quality standards for requiring a certain quality of presentation for participating websites.

In one preferred embodiment for an improved Internet Directory System, the top two upper levels, so to speak, (comprising the search engine and the "fields" or highest categories) would be owned and managed by an Internet Service Provider or Search Engine. At the category level, a level thoughtfully chosen with respect to its economic viability and manageability, each "category" directory would become an independent business, operating as an independent directory website. The participating Category Directory Websites (CDWs) would provide lists of businesses or webpages within their domain, and organize those lists into subcategories with hypertext links to transport viewers to selected webpages.

One potential business feature of a Category Directory Website is to offer to manage the content of listed websites as well as to promote and support its subordinate webpages. The design, technology and content of the directory website itself, as well as its value-added services to listed webpages, should be specifically tailored to attract viewers to the site while enhancing the visibility and success of each individual page.

The design, technology and content of the directory website may in fact be subject to System standards, imposed from a business model.

In a further embodiment, when appropriate, a Category Directory Website may opt to enter into a contract with an Advertising and/or Promotional Agency to design, market and promote the site. In exchange for its services, the Advertising/Promotional Agency may be empowered by the site to sell ad space on the site (a captive, target audience), and to collect the subsequent revenue. Since the Advertising Agency is paid based on the number of clicks on the website spot ads, this arrangement provides extra incentive for the Agency to ensure the visibility, traffic and success of the site. Such arrangement may form part of a "business model".

The Category Directory Website preferably contracts with one or more DPs (ISPs or Search Engines or the like) to be included in their Web Directory database, and then to be listed under one or more of the DPs' fields or super-categories. An independent System Manager may exist to supervise operation of the System, impose part or all of the business model, and/or to issue or supervise the issuance of URLs.

The instant improved Internet Directory System can potentially replace or supplant or absorb some of the aforementioned plethora of Electronic Yellow Pages, and should "best" the Open Directory Project by replacing volunteer "editors" with profitable, independent businesses organized to manage each category under the general guidance of the System and a business plan or model. The independent businesses, called herein Category Directory Websites, provide a portal for each category and maintain a database/listing for all the participating businesses/WebPages within the domain. CDWs are encouraged or motivated, or perhaps even required, to get their level of participation high, at least above some minimal standard. At least one DP should be encouraged or mandated by the System or business plan or model to exhaustively develop CDWs to cover all relevant categories. Portals can take advantage of national advertising to promote their categories, and offer specialized search engines to pinpoint the locations of WebPages. For fees similar to print or Yellow Page advertising, the Category Directory Websites can bold type or enhance listings, design and host multi-lingual WebPages, implement cutting edge technology, support electronic transactions and/or provide a host of other services tailored to attract and retain viewers to the portal/category. The CDWs, or the System, should be able to do so cost effectively, for a cut rate.

The universe of Category Directory Websites (CDW) is potentially as limitless as categories of information. Collectively, these CDWs form an improved Internet Directory System, hosted by a DP, such as ISP(s) and/or Search Engine(s). The first and most lucrative segment of the improved Internet Directory System should be a "Business Directory."

The improved Internet Directory System should be organized into standardized fields to "house" the Category Directory Websites. The CDWs pay an ISP (or DP) to be listed in one or more of its fields. The fees are preferably based on the number of WebPages hosted (or linked) to the CDW.

In addition, preferably an improved Internet Directory System implements a new Internet advertising model that allows improved Internet Directory licensed portals to get marketing and design assistance, as well as national advertising, at no cost. This breakthrough can give the CDW businesses and WebPages within the improved Internet Directory System portals unprecedented visibility and accessibility, making the portals extremely attractive and affordable.

Objects and Advantages-Summarized in General

Accordingly, several objects and advantages of the improved Internet Directory System, designed to increase website visibility and generate revenue, which can be mentioned are:
(a) creates an unlimited number of Directory Websites, each representing a specific category of content or type of business;
(b) creates an independent business to professionally manage and promote each Category Directory Website;
(c) shifts the basis for Internet revenue from advertising dollars based on volatile "clicks" counts to fees based on billions of web postings (growing and stable);
(d) establishes a steady, stable Internet revenue stream for Category Directory Websites that is independent of advertising dollars;
(e) provides a steady, stable revenue stream (independent of advertising dollars) to Directory Providers (such as Internet Service Providers and major search engines;)
(f) provides a new Internet business model and revenue stream for advertising and promotional firms;
(g) promotes a stable Internet economy to support future Industry growth;
(h) creates a financial incentive for each Category Directory Website to tailor its technology and services to best support and promote its content category;
(i) enables webpages to take advantage of cutting edge technology and other value added services at a discounted group rate, features that would have been too costly individually;
(j) draws viewers with cutting edge technology;
(k) establishes a unique TLD (extension after the "dot") that identifies a site as a Category Directory Website;
(l) encourages Category Directory Websites to select and register domain names that correspond to their categories;
(m) encourages Category Directory Websites to be registered with one or more Internet Service Providers or major search engines (or Directory Provider);
(n) allows Category Directory Websites to be registered/listed in more than one field under an ISP or Search Engine (or Directory Provider);
(o) enables webpages to be listed in more than one Category Directory Website;

In addition, this method and system can be implemented without a large initial investment since existing Directory Websites can easily convert with little effort or cost. New sites can be established by maximizing the use of strategic alliances. Further objects and advantages will become apparent in reading and reviewing the description and drawings. Obviously, not all embodiments need support all objects and/or advantages.

More particularly, several objects and advantages of the Improved Internet Directory that can be summarized are:
Creates a new Internet business system;
Produces a multitude of profitable, stable Internet businesses;
Builds a stable Internet economy to support future Industry growth;
Shifts the basis for Internet revenue from advertising dollars and "click" counts, to steady fees based on billions of web pages (a stable, growing basis);
Establishes a steady, stable Internet revenue stream for Category Directory Websites, ISPs and search engines (or DP);
Provides a financial incentive for Category Directory Websites to promote the industry/businesses they represent;

Promotes industry and business providing unprecedented exposure at reasonable rates;

Creates a new Internet business model and revenue stream for advertising and promotional firms;

Advertising/promotional profits can be tied to the effectiveness of their promotions;

Enables webpages to take advantage of cutting edge, "push" technologies offered by Category Website Directories. The new technology;

Attracts and retains viewers;

Drives demand for new Internet technologies;

Drives demand for broadband;

Drives demand for the new software, hardware and peripherals; and

Can be implemented without a large initial investment.

BRIEF DESCRIPTION OF THE DRAWINGS

A better understanding of the present invention can be obtained when the following detailed description of the preferred embodiments are considered in conjunction with the following drawings, in which.

REFERENCE NUMERALS IN DRAWINGS

10 Internet Service Provider/Search Engine
11 Domain Registration Site
12 Field
13 Category
14 Directory Website
15 Promotions/Advertising Agency
16 Businesses/Webpages
18 Subcategories The drawings are primarily illustrative. It would be understood that structure may have been simplified and details omitted in order to convey certain aspects of the invention. Scale may be sacrificed to clarity.

DESCRIPTION OF PREFERRED EMBODIMENTS

One preferred embodiment of the Internet Directory of the present invention is illustrated in FIGS. 2, 3, 4a and 4b. In the preferred embodiment of FIG. 2 the Internet Directory has Fields, Categories and Subcategories, but the Internet Service Provider or Search Engine (or Directory Provider) provides a Business Search Engine 10 and multiple, pre-determined business Fields 12 (i.e. Health Care, Professional, Retail, Services).

Each Category or "Directory Website" 14, indicated as lying below level 20, represents a type a business or profession, and the Directory Website operates as an independent business. According to preferred business plans, the Directory Websites at least list, and preferably help manage and promote, the webpages within their domain and provide appropriate value added services and cutting edge technology to their clients, preferably on a cut-rate fee for service basis. The Directory Website preferably provides viewers with a free comprehensive listing 16 of the names, addresses and telephone numbers of all the businesses within its category. Preferably the list is organized into subcategories 18, such as by location (nation, state, metropolitan area, city) and by classification, to the extent appropriate. Hyperlinks take viewers directly to the webpages of the businesses that subscribe to or participate in the Directory's services.

Figure 3B:
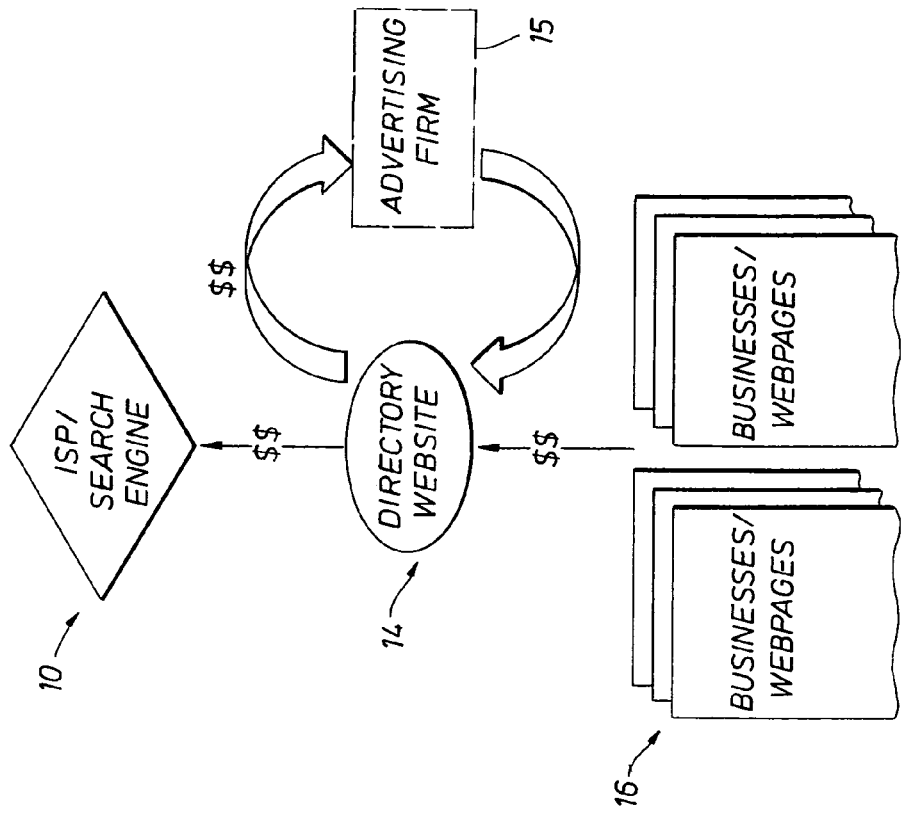
FIG. 3b—Financial Model with Advertising Embodiment—Deviates from FIG. 4a by providing the option of the DW entering into an agreement with an Advertising or Promotional Agency to design, market and promote the DW for free in exchange for the advertising revenues generated by the DW site(s).
Figure 3A:
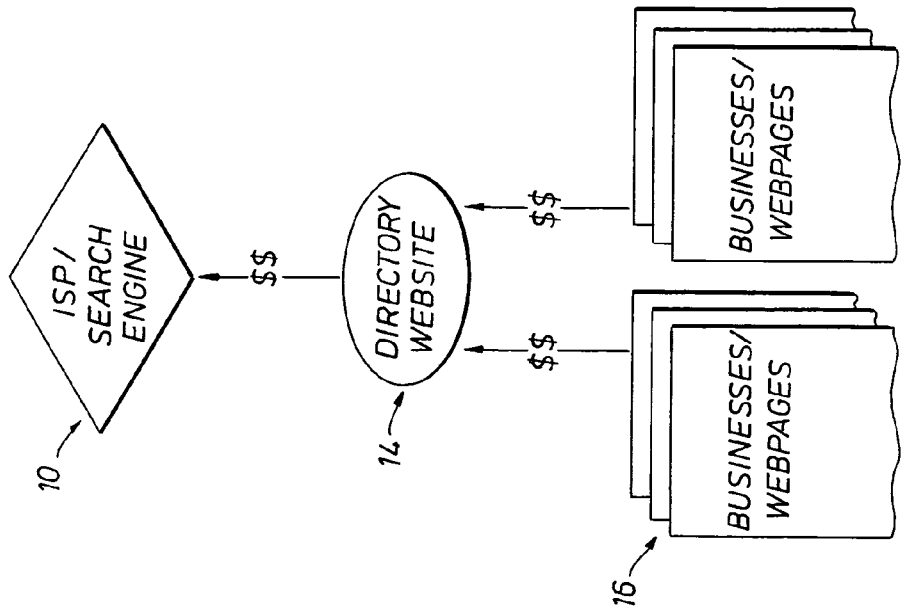
FIG. 3a—Financial Model—shows a steady, stable Internet revenue flow created by Directory Websites (DW) charging subordinate webpages for promotional and other value added services provided by the Directory, and the DW paying the Internet Service Provider or Search Engine Site to participate in its Internet directory services.

FIG. 3a shows a preferred Financial Model. The businesses listed 16 may elect to contract with one or more Directory Websites for selected services to increase their exposure and attract new viewers. In turn, the Directory websites pay one or more ISPs/Search Engines (Directory Provider) a fee for the services it provides. This fee is based on the total number of businesses it has on contract. Using webpage listings and/or other services provided to webpages as the revenue base for the Improved Internet Directory System can create a stable, dependable cash flow.

FIG. 3b shows the same Financial Model with an Advertising Embodiment. In this embodiment, a Directory Website 14 with lots of traffic, or potential traffic, contracts with an Advertising or Promotional Agency 15 for design, marketing and/or promotional services to be provided at no cost to the Directory Website 14. In exchange, the Advertising or Promotional Agency 15 sells advertising spots on the Directory Website and collects the revenue generated, such as from "clicks", as payment for its services. This allows the advertiser to get paid based on the effectiveness of its products and services, and the Website Directory to get paid for the effectiveness of its business.

Figure 4:
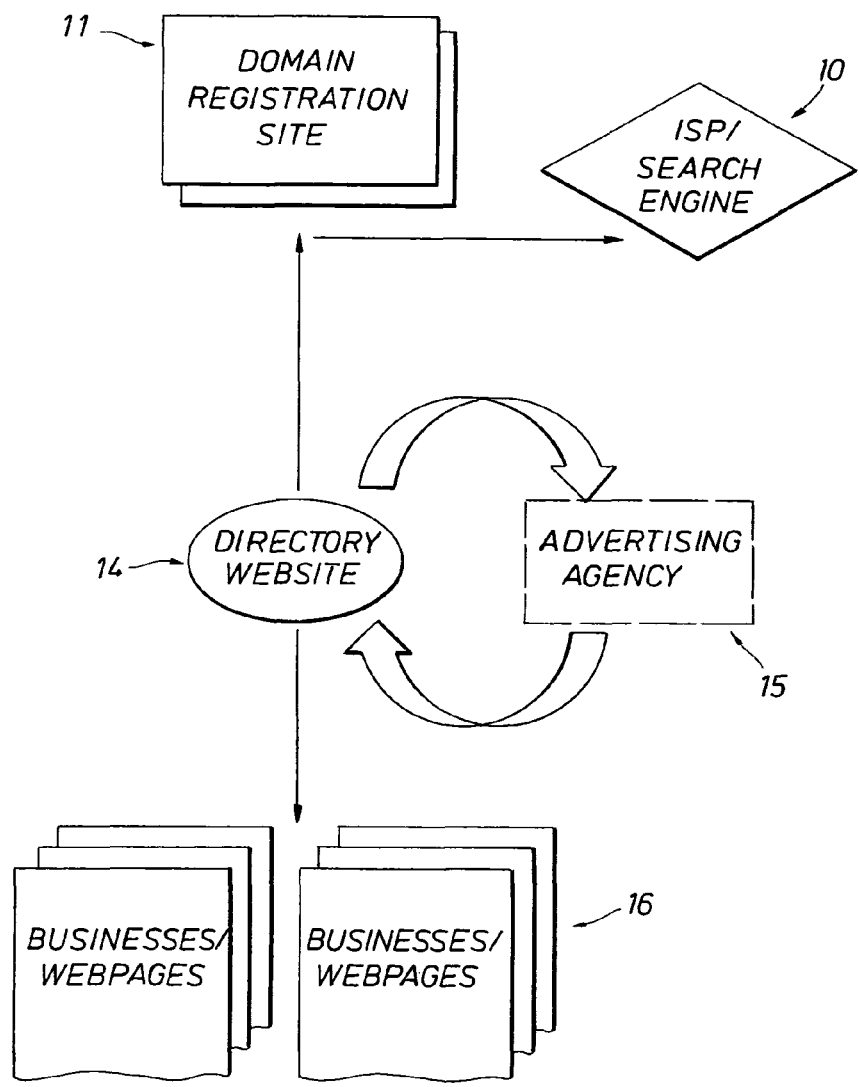
FIG. 4—Initiating the Method and System—shows the steps in developing the Method and System for Website Access

FIG. 4 shows how to "Initiate an improved Internet Directory System." A potential Directory Website first considers the options to determine what type of business or profession it will represent 16. Preferably, this will be one that has not already been chosen by another Directory Website. (The System might mandate such. The System or a System Manager may control the denomination of the categories as well, such that they are relevant, economically viable and manageable.) The potential Directory Website then evaluates what types of services would attract the most clients, and estimates what must be charged for the services to be profitable (and for which services to charge.)

As part of the research, the Directory Website (DW) 14 may acquire a comprehensive listing of all current names, addresses and telephone numbers of the chosen category 16 (nationally and/or internationally). Manufacturers, related professional associations, listing services, or directory services are possible sources of this information. This data will identify the universe of businesses in the category and, with some market research, provide an indication of what market share might be obtained.

In another embodiment, if the DW sees the potential of a large market share with the right mix of services to attract and retain viewers, it may wish to contract with an Advertising or Promotional Agency 15 for its services at no cost to the Website Directory. In exchange the Agency 15 will sell advertising spots on the Website and collect all the generated revenues.

The Directory Website 14 preferably then registers with a Domain Registration Site 11. A licensing and usage fee is paid to get a special TLD (the 3 letter extension after the dot) designating the site as a Directory Website, such as ".dir". Each Directory Website is encouraged to select and register domain names that correspond to their category.

The Website Directory then contracts with one or more ISPs/Search Engines (Directory Provider) 10 to be listed in one or more of their fields.

Alternate Embodiments

Figure 1:
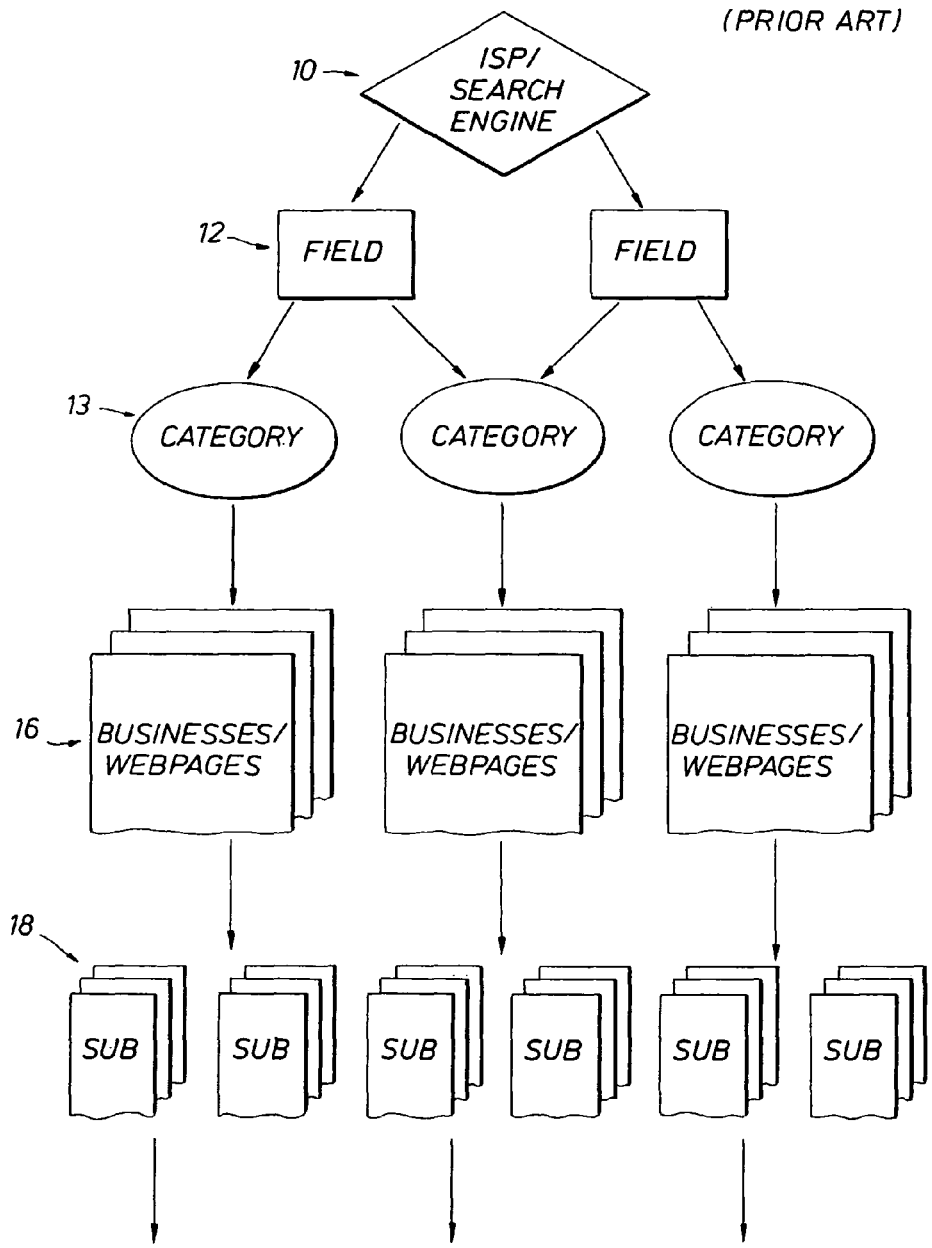
FIG. 1.—Prior Art—shows an overview of an existing Internet Directory that operates as single business managed by either an Internet Service Provider or a Search Engine Site.
Figure 2:
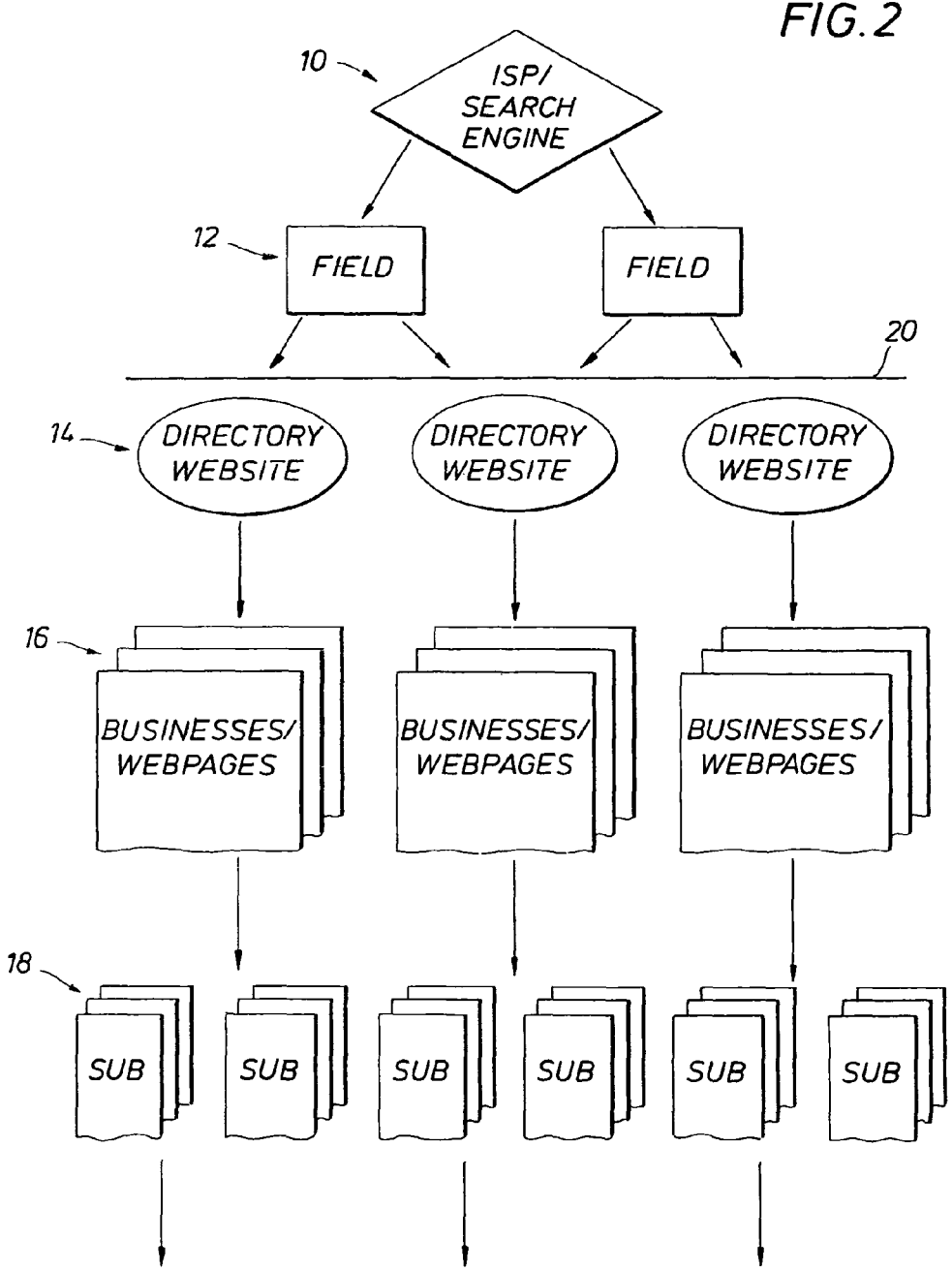
FIG. 2—Overview of Improved Internet Directory—shows an Internet Directory in which the Service Provider or Search Engine owns and manages only the first two levels (the Search Engine and the "Fields"). In the third level, each Directory Website is independently owned and managed.

The improved Internet Directory System illustrated in FIGS. 2-4 can be applied to other fields as it was to the business field. In this general embodiment, the Internet Service Provider or Search Engine or the like provides a Search Engine 10 and multiple, pre-determined content Fields 12 (i.e. Art, Music, Games, Family). FIG. 4 also shows how to initiate an improved Internet Directory System for other fields. The potential Directory Website first researches the options to determine what area of interest it will represent 16. Preferably, or by mandate from the System, this will be one that has not already been chosen by another Directory Website. It then evaluates what types of services would attract the most clients, and estimates what must be charged for these services to be profitable. As part of the research, the Directory Website (DW) 14 may review existing related webpages from different Search Engines. This data will help identify the universe of websites in the selected category and, with some research, determine the viability of the proposed Directory Website. The Directory Website 14 preferably then registers with a Domain Registration Site 11. A licensing and usage fee is paid preferably to get a special TLD (the 3 letter extension after the dot) designating the site as a Directory Website. Each Directory Website is encouraged to select and register domain names that correspond with their category. The Directory Website then contracts with one or more ISPs/Search Engines 10 to be listed in one or more of their fields.

Overview of the Players for Certain Preferred Embodiments

1) ISPs and Search Engines (or the like, Directory Provider). An improved Internet Directory System Provider typically comprises an ISP and/or a Search Engine. Such entity may also comprise a System Manager, although a System Manager need not necessarily be limited to those entities. The Directory Provider, typically an ISP or a Search Engine, preferably contracts with the Category Directory Websites to be listed in the ISP/Search Engine's improved Internet Directory. (Of course, CDWs could approach one or more ISPs to be listed. The preferred business plan or model envisions that the CDWs will be licensed. The licensor could be an ISP, a Search Engine, a DP or another System Manager.) ISP/Search Engines preferably provide: the improved Internet Directory listing service; a search engine that searches across the fields, categories and sub-categories; and related services for the CDWs. In return ISPs and Search Engines gain a steady, stable revenue stream from the CDWs. The System can be implemented by one ISP/Search Engine or by a plurality, although one is preferred.

2) Category Directory Websites. The improved Internet Directory's Category Directory Website business plan and business model builds profitable businesses that manage and promote the categories they represent. The Category Directory Website provides users free comprehensive national or international listing of the businesses within their category/domain. Listed businesses that want higher visibility can take advantage of the other multiple services offered by the System. There can be as many Category Directory Websites as there are possible categories of information. Existing businesses, such as Electronic Yellow Pages, sites providing listings of businesses or professionals (especially those with high volume or potential high volume clicks), businesses developing or hosting websites, trade/professional associations maintaining directory websites, and manufacturers such as auto manufacturers are prime candidates to successfully build new sites or convert existing sites to create an improved Internet Directory System.

3) Advertising/Promotional Agencies. Advertising/Promotional agencies preferably promote the CDWs at no cost, in exchange for the revenue generated from spot advertising on the CDW portal. Advertising/Promotional agencies gain a new Internet revenue stream directly tied to the creativity and effectiveness of their effort. Large agencies have an advantage because they have the internal resources provide up-front funding for the system. Smaller agencies can participate by being creative, establishing business partnerships and/or seeking external funding.

The Exclusive Option and Business Plan and Model for Preferred Embodiments

1) One ISP or the like may be offered an exclusive position as Directory Provider (and possibly System Manager) for the System, or at least an Exclusive Option (EO) for a set period of time, in exchange for an up-front fee. The EO allows the ISP to control the start-up and operation of the System to ensure the success of the improved Internet Directory System under the business plan and model, and protect the ISP's investment.

2) An EO allows the ISP to hand pick the businesses it thinks will be the most successful Category Directory Websites (CDWs) to build a profitable improved Internet Directory, preferably first for Business. These businesses will have first choice of the category websites with the greatest potential for great technology to attract the most viewers (sites related to vehicles, travel, entertainment, amusement parks, music, shopping, etc), and will have a competitive edge in establishing a large, loyal viewer market.

3) During the EO timeframe, the ISP can offer the future CDWs the opportunity to access/utilize services in the ISP's existing business operation, in exchange for a fee, or percentage of the CDW's profits. ISP services might include, but are not limited to: hosting sites on the ISP's regional servers, search engine services, discounted rates on network services, its technology and/or technology support, a help desk, or even a loan to help the business convert to the improved Internet Directory. This relationship reduces the cost to build and maintain a CDW, provides the ISP with additional long term revenue in exchange for establishing the Directory, and helps ensure the success of the first improved Internet Directory, preferably first for the business sector.

4) The ISP can assist/finance Advertising Agencies in their initial ramp up to the new Internet advertising structure that is part of the improved Internet Directory System. In addition to loans, the ISP can offer to run advertising spots for CDWs in tandem with ISP's advertising, other advertising/promotional support, in exchange for a fee or percent of future revenue. ISPs coming on board later, if any, will not have participated in the funding and will not have opportunity for to additional revenue.

5) The EO allows the ISP, preferably, to enforce a business plan and model on the DWs, including standards for the design, technology and content of the DW site. The DW site should preferably be held to a standard that includes being well designed, having good links and relevant content. Alternately, a separate System Manager can impose the business plan, model and standards.

Developing the Improved Internet Directory

Preferred Embodiments

The Background

6) With the support/assistance of the ISP, a request is made to ICANN to create a unique TLD (extension after the "dot") to identify participating Category Directory Websites.

7) The System preferably includes contracting with or building one or more Domain Registration Sites to carry the TLD, collect the ISP fees, and the Improved Internet Directory licensing fees.

The Internet Service Provider (ISP):

8) Is licensed to build the improved Internet Directory including having the business plan and model imposed. The improved Internet Directory for Business should be one of the most lucrative Directories and preferably should be built first.

9) Establishes the "fields" or "super categories" that will contain all the various categories of business for the first improved Internet Directory for Business. May also establish categories. Category Directory Websites may pay to be listed in more than one field, where appropriate, to increase their exposure.

10) Develops an internal system to determine how it will select/approve and monitor Category Directory Websites requesting to be listed on its improved Internet Directory.

11) Develops the ISP's improved Internet Directory.

12) Determines what services it will provide to Category Directory Website (CDW) in addition to the search engine services.

13) Estimates the cost to deliver its services.

14) Develops the fees it will charge the CDWs to be listed in the ISP's improved Internet Directory. Fees are possibly based on the number of webpages within a CDW's domain and the number of services the CDW selects. (If there is no EO, fees should be low enough to allow CDWs to contract with multiple ISPs. Absent an EO, the larger the number of participating ISPs, the greater the potential success of the improved Internet Directory System, and the more stable the Internet economy becomes.)

15) ISPs (or System Manager) might contract with one or more participating Domain Registration Sites (DRS) to collect the ISP fee(s) at the same time the DRS is collecting the domain registration fees.

The Future Category Directory Websites (CDW):

16) Select and research the category the CDW wishes to represent to determine viability.

17) Research the market for the category. Can sufficient webpages be enlisted to support the CDW?

18) Contact trade or professional associations connected with the business/industry to create win/win business arrangements between the CDWs and the association(s).

19) Create, purchase or lease a comprehensive national or international directory listing [name, address, zip code, telephone number(s)] of the businesses within the selected category/domain. Manufacturers, related professional associations, listing services, or directory services are possible sources for this information. This list will be provided by the CDW, at no charge to the businesses, and accessed by viewers at no charge.

20) Evaluate if the "universe" of the chosen category is too large or too small to be developed and managed by the CDW and its technology infrastructure.

21) Estimate the cost to build and maintain the CDW portal. How many webpages and other services must be sold, and at what price for the CDW to be profitable? (Some services, such as listing, could be for no charge.)

22) Hire or contract for the skills and manpower to design, build and support the CDW portal and its operations.

23) Develop a directory database that divides the information into subcategories, allowing viewers to perform searches and sub-searches appropriate to the category. These searches might include, but are not limited to: name, county, city, zip code, neighborhood, street address, phone number(s), type of business, services offered, merchandise, specialties, date opened/established, price, discount, wholesale, retail, promotional events, directions and hours of operation.

24) Develop a hypertext link between the listing and the business' webpage.

25) Evaluate what services and technology would attract and retain the most viewers.

26) Design and build the CDW portal to make the improved Internet Directory system a success, within the guidelines of the business model. The CDW portal might include, but is not limited to: secure services for on-line transactions; translation services to support multi-lingual websites, ADA compliance of the portal and subordinate webpages; an array of new technology to attract and retain viewers; chat rooms, e-mail for webpage participates, maps and visitor tracking; and/or links to related websites of interest to potential viewers.

27) Build, buy or contract for the equipment and bandwidth services to create the infrastructure to support the CDW portal and its subordinate webpages.

28) Contract with an advertising firm (if applicable) for advertising and/or promotional services for the CDW portal and its subordinate webpages. These services might include, but are not limited to: portal design, a national advertising campaign, portal promotional events, and standardized client webpage offerings such as on-line coupons, sales announcements, spot advertising on the website's portal for business webpages, special promotions, or random prizes/awards for visitors. The advertising/promotional agency may provide these services without cost to the CDW, in is exchange for the revenues generated by the spot ads they sell on the CDW portal site. The cost for customized design/promotional services for the portal's individual client webpages would be charged to the individual webpage.

29) Estimate costs for the different services, and establish a profitable, affordable fee structure, starting with simple additions such as bolded or enhanced listings, and moving up from there. The rates should be comparable to those for print and Yellow Page advertising and may fluctuate based on the size or geographic region of the business.

30) Contact businesses to be listed in their domain and market CDW services.
31) Register a domain name for its Category Directory Website Portal, (and URLs for the subordinates, if appropriate. The domain names should correspond to the categories and subcategories.)
32) Pay the ISP Directory to be listed in one or more fields to increase exposure, and list the CDW with more than one ISP, if possible.
33) Pay licensing fees for the improved Internet Directory System at designated Domain Registration Sites. Licensing fees are nominal, and are probably based on the number of subordinate webpages in the domain. Abide by the Business Plan and Model standards.

Advertising Agencies:

34) Work with their Category Directory Websites to design portal sites that are unique, maximize new technology were appropriate and will attract and retain viewers.
35) Work with Category Directory Websites and with the ISPs to develop low cost, highly effective national or international campaigns for the CDW(s).
36) Design spot advertising approaches that can be implemented on the CDWs, do not impede the operation of the site, and will not drive away viewers.
37) Work with their CDWs to determine the most appropriate website technologies to support their spot advertising and promotional efforts (on-line coupons, discounts, special promotions, random prizes for viewers, etc.).
38) Estimate the cost of doing business in the improved Internet Directory System, developing a competitive per click rate for potential spot advertising customers, and selling the spot ads to their clients.
39) Arrange interim financing, either internal or external to the agency, to cover upfront staff and advertising costs prior to the return from the spot advertising revenues.
40) A System Manger or an independent entity can impose and/or enforce a business plan and model on CDWs. A portion of the business plan and model may apply to the Directory Provider. At the least, the business model provides a standard for at least one of design, technology and control for a CDW site. The System Manager may manage and supervise identifying marks or URLs for the System.

Additional Embodiments

In addition to the improved Internet Directory for Businesses with businesses listings, there can be improved Internet Directories to contain websites specifically for children, for adults only, for music lovers, gaming, government, travel or other popular, voluminous categories. In this embodiment, the Category Directory Website preferably provides a list of all websites in the domain at no charge, but offers technology and other value added services for a fee like the Business directory.

Operation

First Example

The manner of using the improved Internet Directory is similar to the existing Internet Directories. Namely, one first accesses their Internet Service Provider (ISP) or favorite Search Engine 10, locates the Business Directory Search Engine (which is frequently one of the Yellow Pages), then locates the appropriate field. The fields are broad categories such as Dining and Entertainment, Industrial, Medical, Professional, Repairs, Retail, Services or Automobiles. For purposes of this illustration, the goal will be to find out about a new Toyota Camry, so that field 12 selected will be "Automobiles."

(Preferably the viewer finds out the Business Directory Search Engine, the fields and the Category Directory Website (CDW) from ads and promotional events resulting from the CDW's contract with an Advertising/Promotional Agency.)

The business plan and model imposed on the CDWs ensure that Category Directory Websites 14 listed under "Automobiles" are all professionally managed, preferably ensuring that are well designed, the content is relevant, and the links are good. A click on the "Toyota" Directory Website 14 brings up information on Toyota and has information on all the Toyota dealerships in the nation and some international dealerships. The data is organized into subcategories by location (state, metro area, city) and a screen allows the viewer to narrow the search by either providing the name of the dealer or its location (general or specific). "Champion Toyota" 16 is selected. Data is also preferably organized by model and feature, so the viewer can compare the features of the different models.

Champion contracts with the Directory Website (DW) 14 that represents "Toyota." Its website to preferably was designed by and is hosted by the DW. On the webpage, the viewer is able to pick the car and accessories desired. The 360 technology and virtual reality allows the viewer to electronically walk around a Camry, and even to look under the hood. Then, using a mouse the viewer preferably can open the car door, get in, see the layout, examine all the equipment, play the CD, honk the horn, turn on the lights and then take a virtual test drive. (This type of technology would have been too expensive for a single dealership to maintain, but with the Directory Website managing the webpages the cost can be spread across multiple businesses.)

After taking the test drive, and reading the statistics and reports on the Toyota, the viewer has the option to move to a secure site and make an offer on the car. This, too, can be a service offered by the Directory Website.

Second Example

A couple in New Mexico is planning a trip and loves roller coasters. They want to go to an Amusement Park that has the most number of roller coasters. They have been seeing ads about the "AmusementParks.dir" website and want to check it out.

"AmusementParks.dir" is a Category Directory Website in the Improved Internet Directory System. To access the Improved Internet Directory the couple will access a licensed Internet Service Provider (ISP) or Search Engine and click on the Business Directory/Improved Internet Directory for Business. The Directory will be organized into "Fields" (very broad categories of information such as appliances, automobiles, contractors, churches or family entertainment). After reviewing the standardized list of "Fields," the couple will click on "family entertainment" and be transported to the "family entertainment" portal.

The portal will contain a list/database of all the Categories/Category Directory Websites relating to "family entertainment." The couple will review the list and click on "AmusementParks.dir" and be transported to the "AmusementParks.dir" portal.

The "AmusementPark.dir" portal has a search engine that will allow the couple to find Amusement Parks by location (country, region, state, county, city), by corporation (Six Flags, Disney, etc), or by number and types of rides offered. After looking at several of the Amusement Park webpages in "AmusementPark.dir" the couple decide to go to Six Flags Over Texas in Arlington. Under the Improved Internet Directory system, the Six Flags Over Texas webpage would tell the couple all about the Park and its rides, let the couple take a virtual ride on one of the roller coasters, and take a stroll through the park using 360 technology. The couple could find out about hours of operation, the weather in Arlington, read reviews from other visitors, get tickets on-line, or find and book lodging nearby.

Example

A Sample Business Model Outline

The Advantages
  The "Business Model" brings effectiveness and profitability back to the Internet.
  The "Internet Business Integrator" is a new function that can be implemented by new or existing businesses.
  The "Business Model" offers a new revenue model for websites.
  The "Business Model" creates a new revenue stream to the Advertising Industry.
  The "Business Model" brings the websites of "like businesses/topics" together under a single portal, creating a new organizational structure for Internet websites.
  The fee charged by the Internet Business Integrator will help eliminate Internet "clutter."
  Websites maintained by Internet Business Integrator can be translated into other languages for International use.
  The new Internet organizational structure gives websites more visibility and accessibility, making them easier to access.
The Applications
Internet Users:
  The organizational structure of the "Business Model" helps Internet users find information and access websites.
Businesses:
  The "Business Model" creates a Web Business Integrator function that can be filled by multiple types of existing businesses. For example:
  Entrepreneurs can bring together a group of "like businesses/topics" (restaurants, hospitals, night clubs, fitness centers, etc) under a single portal, and if desired, offer information an informational site about the business/topic area at the portal level (i.e. food, health, music, fitness, etc).
  Existing businesses, such as Internet Access Providers, Web Site Designers, Web Site Developers, Web Site Services and Consultants can work with Internet Business Integrators, or expand their businesses to include this function.
  Manufacturers, such as General Motors, can develop a single portal to view their latest models, take virtual test drives, and access the websites of all their dealers.
  Special interest groups can utilize the "Business Model" to provide a common umbrella. For example, the Presbyterian Church may with to use the "Business Model" to create a single portal to access the information about the church, its beliefs and doctrines, and a comprehensive listing (by area) of all the Presbyterian Churches and their websites.
  Professional Associations such as the American Bar Association (in conjunction with its state affiliations) can use the "Business Model" to provide a single portal to access a comprehensive listing (by area and specialty) of all licensed attorneys and their websites.
The Concept
  The "Business Model" introduces a new organizational structure for Internet that generates a revenue stream for portal websites.
The Problems Addressed
  The Internet Community is looking for a new, profitable Business Model of the Internet.
  The Advertising Industry is in a slump, and looking for new, profitably ways to do business in the Internet arena.
  The Internet lacks the structural organization to adequately support the millions of business websites.
  Many websites are not translated into other languages, limiting their scope and usefulness.
The Model
  The "Business Model" vertically organizes "like businesses/topics" by subject using a portal structure. The portal opens at the highest level (usually national or international) then offers sub-portals at the regional and local/city level. This organization by subject, location and website makes it easier to locate and access information on the Web. In this model, the Web Business Integrator provides content by bringing together and organizing "like businesses/topics" under an international portal that provides value added services to the business. Websites under the portal are charged for the "value added services" provided by the Web Business Integrator.
  The volume of businesses/topics within the portal greatly increases the number of viewers at the portals and sub-portals. Intensive advertising further boosts the number of viewers and "clicks" from profiled users accessing national and local portals . . . a natural "fit" for national and/or regional ads. In the "Business Model" the revenue from the portal's spot advertising (calculated on clicks) compensates the advertising firm for its efforts.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. An improved Internet Directory System, comprising:
  at least one upper-level Directory Provider (DP), providing an upper-level directory of lower-level directories, the upper-level directory organized by at least upper-level fields and/or super-categories and categories (together, upper-level categories) and referencing hundreds of independently owned (from each other and from the Directory Provider) for-profit lower-level directories Category Directory Websites (CDWs) related to the upper-level categories, the CDWs organized by lower-level categories and subcategories;

the hundreds of CDWs each providing a lower level directory comprehensively referencing viable websites (WSs) relating to a category;

the CDWs being identified as participating in the System by the display by each CDW of a common licensed service mark, the common licensed service mark being displayed by the hundreds of CDWs to indicate participation in a unique source of an internet directory system; and a business model imposed on the CDWs by the DP or System, including standards of operation of uniform organization, comprehensiveness of reference and up-to-dateness with respect to the provision of lower level directories.

2. The System of claim 1 wherein the common licensed service mark is included in a portion of a Universal Resource Locator (URL) associated with the CDW.

3. The System of claim 2 wherein the portion of the URL includes a Top Level Domain (TLD).

4. The System of claim 1 wherein the business model includes a standard of operation of providing professional management.

5. The System of claim 1 wherein the business model includes a standard of operation of providing a comprehensive listing of viable websites (WSs) related to the category for no charge.

6. The System of claim 1 wherein the business model includes a standard of operation, imposed on at least a subset of CDWs, of a CDW offering WSs at least one of an option to move to a secure site to negotiate a purchase and an organization of pertinent comparative data on a subject within the category.

7. The System of claim 1 wherein the business model includes at least one of charging at least some WSs for enhanced reference; charging at least some WSs for at least one service offered by a CDW; providing advertising space to WSs on a site of a participating CDW; offering WS web page enhancement services at a volume discount; substantially funding operation of a CDW by payments from WSs; providing minimal standards for WSs to be included in a directory and for updating WS references including adding new WSs and for deleting no longer viable WSs and standards for certain quality of presentation for participating WSs; and providing for the CDW being substantially funded through an offer of enhanced listings and value added services, including WSs enhancement technology where appropriate, to websites, such services tailored to a category and specifically designed to attract and retain viewers.

8. The System of claim 1 wherein the System includes contracting by at least one DP with a plurality of CDWs to secure a comprehensive listing of CDWs with respect to at least one upper level category.

9. The System of claim 1 wherein the DP comprises an ISP or Search Engine.

10. The System of claim 1 wherein 1) the category and 2) at least one field and/or super-category are both more than simply an indicator of city, state, region or nation.

11. A method for participating in an Internet Directory System, comprising:

organizing an independent for-profit directory website to comprehensively reference viable websites (WSs) within a category, providing thereby a lower-level directory;

participating in an Internet Directory System by said directory website by contracting to be referenced as one of hundreds of participating Category Directory Websites (CDWs) in at least one independent upper-level Directory Provider's (DP) upper-level directory of lower-level directories, the upper-level directories organized according to at least upper-level fields and/or super-categories and categories (together, upper-level categories,) the upper-level directory referencing the CDWs;

licensing and displaying a mark as a common licensed service mark by the directory website, the mark functioning as a licensed service mark common to the hundreds of participating CDWs, the mark identifying said directory website as a participating Category Directory Website in a unique source of an interne directory system; and abiding by a System or DP imposed business model imposed on said Category Directory Websites, including operational standards of uniform organization, comprehensiveness of referencing and up-to-dateness with respect to the provision of the lower level directory.

12. The method of claim 11 wherein the upper level directory references consist essentially of CDWs.

13. The method of claim 11 wherein the mark licensed and displayed as a common licensed service mark is included in a portion of a URL associated with the CDW.

14. The method of claim 11 wherein the business model includes at least one of offering at least website enhancement technology cost effectively to appropriate referenced WSs and charging some websites for at least one service such that a profit is made.

15. The method of claim 11 wherein a standard of operation includes at least one of professional management and providing a comprehensive reference to viable websites without charge.

16. The method of claim 15 wherein the portion of the URL comprises a TLD unique to CDWs in the system.

17. The method of claim 11 wherein the hundreds include thousands and wherein the Directory Provider includes an ISP and/or a Search Engine.

18. The method of claim 11 wherein (1) the category and (2) at least one field and/or super-category are both more than simply indicators of city, state, region or nation.

19. The System of claim 1 wherein the hundreds includes thousands.

20. The method of claim 11 that includes the directory website remitting value to a DP or System.

* * * * *